INVENTOR
ALTEN E. WHITECAR
BY
ATTORNEYS

INVENTOR
ALTEN E. WHITECAR
BY
ATTORNEYS

INVENTOR
ALTEN E. WHITECAR
BY
Busser Smith & Harding
ATTORNEYS

INVENTOR
ALTEN E. WHITECAR

United States Patent Office 3,494,817
Patented Feb. 10, 1970

3,494,817
ROTARY TURRET SONIC WELDING APPARATUS
Alten E. Whitecar, Westville, N.J., assignor to Smith Kline & French Laboratories, Philadelphia, Pa., a corporation of Pennsylvania
Filed Sept. 18, 1967, Ser. No. 668,425
Int. Cl. B65c 9/00
U.S. Cl. 156—567                          13 Claims

ABSTRACT OF THE DISCLOSURE

A turret has a plurality of holding means, each capable of receiving an assembly of plastic parts from one conveyor and discharging them to a second conveyor and is provided with a sonic welder associated with each holding means. Each sonic welder is lowered into contact with the associated assembly of parts and energized during a predetermined period of the time it is in contact with said assembly to weld together adjacent plastic parts. The sonic welder is then raised above the assembly and the assembly is discharged.

BACKGROUND OF THE INVENTION

It is well known to weld together thermoplastic parts by rapidly vibrating one part against the other to cause a buildup of heat through friction. Such welding is advantageous in eliminating the use of solvents, adhesives and the like, and permits joining plastic parts made of materials which were previously impractical or difficult to join, such as polypropylene, polyethylene, nylon, polycarbonate and acetal. Generally, the vibrations employed are above the audible range, i.e., ultrasonic, that is, above 18,000 cycles per second, for example, 20,000 cycles per second. While an excellent method of joining thermal plastic parts, sonic welding has heretofore been a relatively slow procedure and not satisfactory for a continuously operating manufacturing line, a defect remedied by this invention.

SUMMARY OF THE INVENTION

The sonic welding apparatus of the invention employs a rotatable turret which is continuously rotated. The turret is provided with a plurality of means to hold an assembly of plastic parts for rotation with the turret. Conveying means deliver assemblies to the holding means and second conveying means receive said assemblies and convey them away from the turret. Each holding means has associated therewith a plurality of sonic welders mounted on the turret and which can be advanced into contact with the associated assembly and withdrawn therefrom as the holding means is rotated between the delivery and receiving conveying means. Each sonic welder is energized for a predetermined period of the time it is in contact with the associated assembly of parts to weld the parts together. Advantageously, a power distribution system is employed permitting the use of a single power supply to supply all of the sonic welders. Timing means may be employed to vary the welding period as between the sonic welders.

PREFERRED EMBODIMENT

Figure 2:
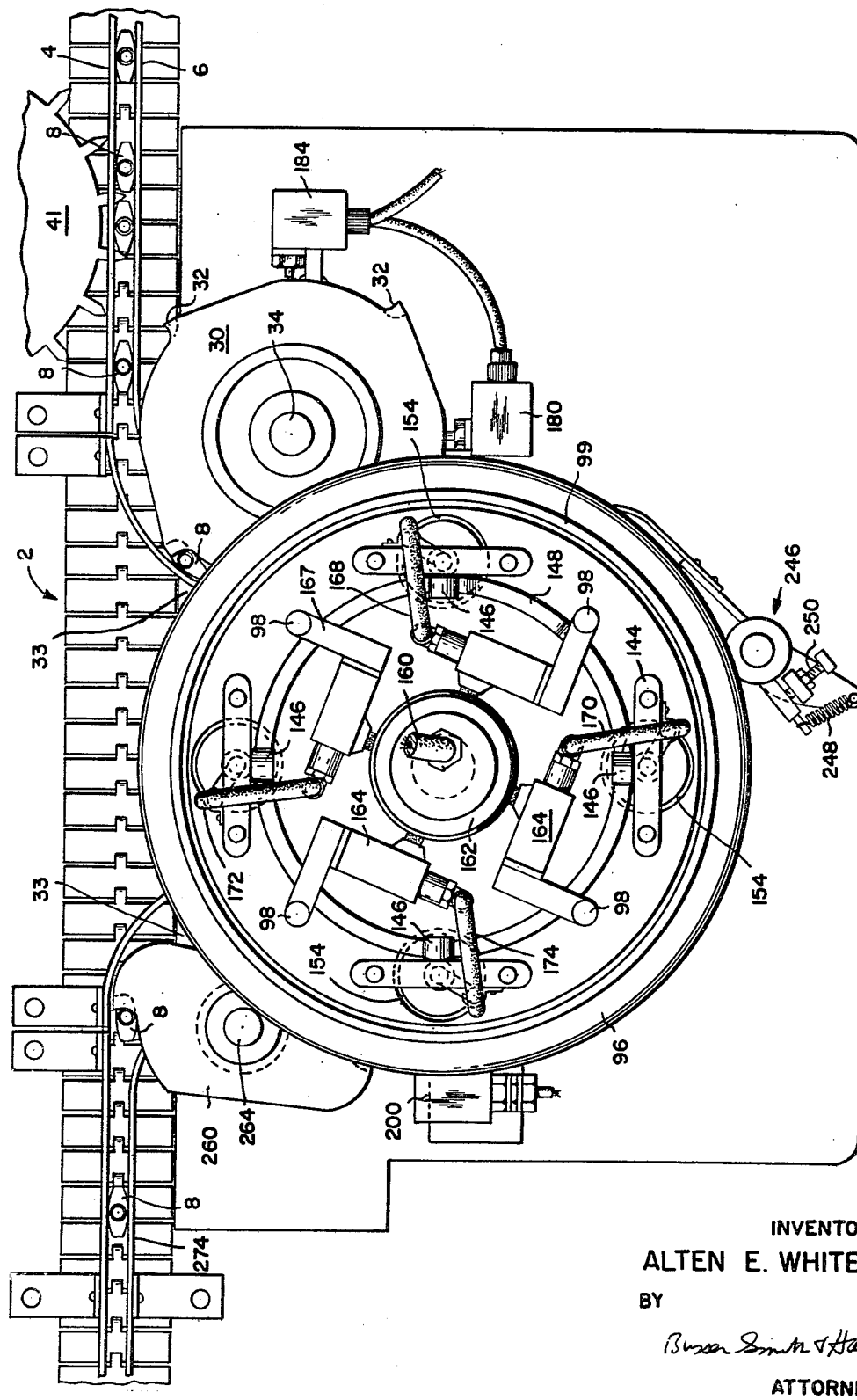
FIGURE 2 is a plan view of the apparatus of FIGURE 1.
Figure 7:
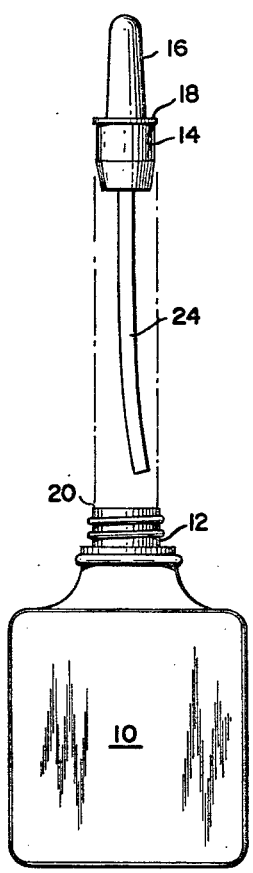
FIGURE 7 is an exploded elevation of a thermoplastic container and its associated thermoplastic plug.

Referring first to FIGURE 2, a conventional separately driven conveyor 2 conveys between guide rails 4 and 6 thermoplastic containers 8. As best seen variously in FIGURES 7 and 8, each container comprises a body portion 10 and a threaded neck portion 12. A hollow plug 14 fits inside neck 12 and is attached to a hollow nasal piece 16. A peripheral flange 18 seats against the upper end 20 of neck 12, the inner periphery of said upper end being beveled as indicated at 22. As shown in FIGURE 7, a liquid pickup tube 24 is connected to plug 14. The illustrated container is useful for administering nasal spray. All of the above described container parts are made of a thermoplastic synthetic resin suitable for sonic welding. By way of example, all of the parts may be made of polyethylene.

A conveying wheel 30 is provided with four equally spaced finger portions 32, each of which is adapted to engage the neck 12 of a container 8 and convey it between the arcuate portions 4a and 6a of guides 4 and 6, respectively, onto table 33. Conveying wheel 30 is rotated by shaft 34 which is connected to a gear 36 (FIGURE 1) driven by a gear 37 connected to main drive shaft 40. Shaft 40 is driven by an electric motor drive (not shown). Gear 36 drives gear 38 at the same angular rate as gear 36. Gear 38 rotates hollow shaft 92.

A timer wheel 41 is timed to space the containers 8 on the conveyor so as to be properly positioned for engagement by wheel 30.

Figure 3:
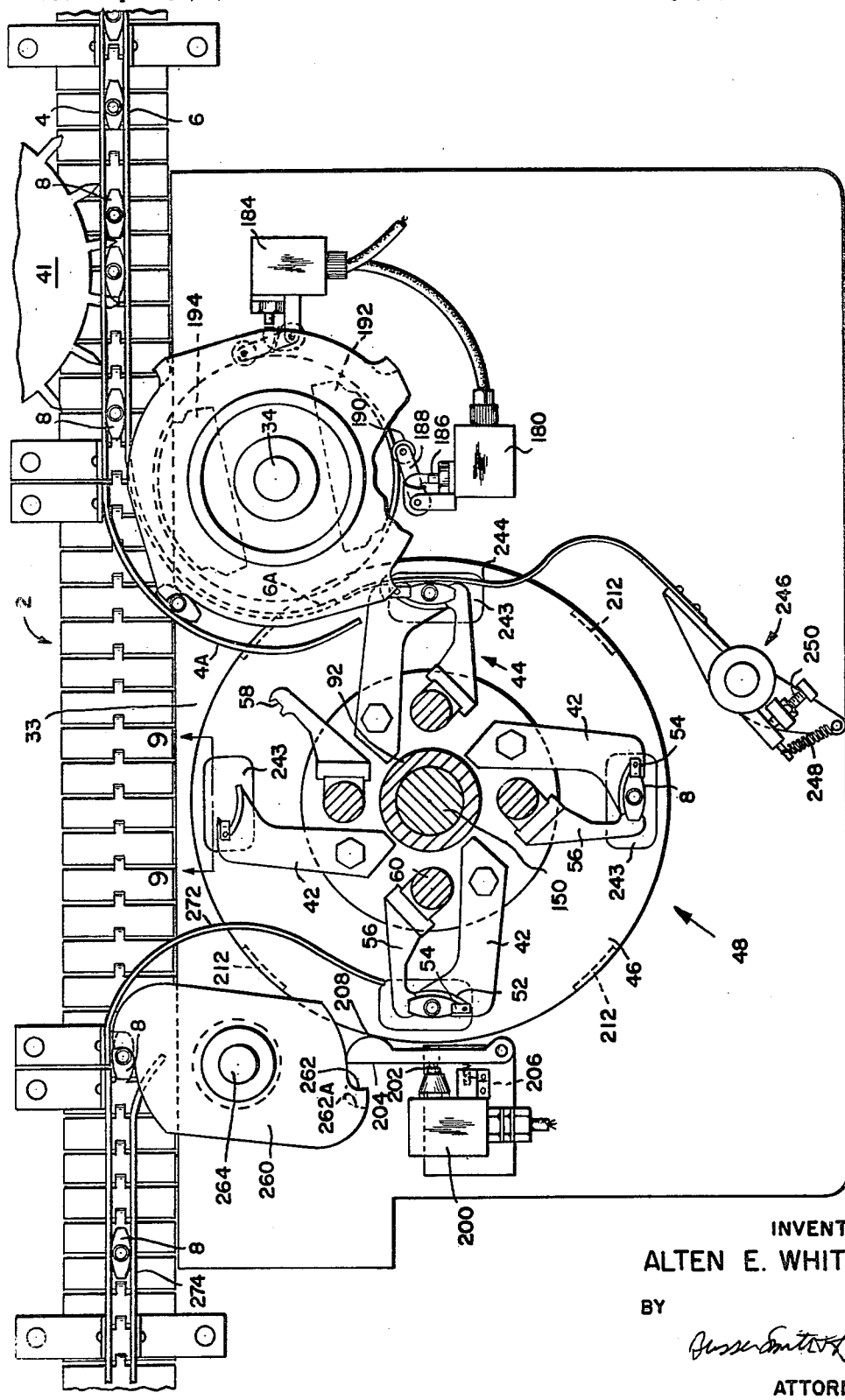
FIGURE 3 is a horizontal section taken on the plane indicated by the line 3—3 in FIGURE 1.

Conveying wheel 30 delivers each bottle 8 to a gripper arm 42 (FIGURE 3) of one of gripper units 44 mounted on a rotary turret 48. Arm 42 is fixedly secured to the rotary base 46 of turret 48 which is connected to and rotated by shaft 92. A gripper unit 44 is provided to cooperate with each finger 32 of conveying wheel 30, there being in the illustrated embodiment four equally spaced gripper units 44. Each arm 42 is provided with an outer portion 52 shaped to partially embrace a bottle 8 and a hold down member 54 to engage the upper portion of body 10 of a bottle 8 to hold the bottle down. Each gripper unit 44 is provided with a movable arm 56 having a portion 58 shaped to embrace one end of a bottle 8. Each arm 56 is fixedly secured to a shaft 60 mounted for rotation in turret base 46.

Figure 4:
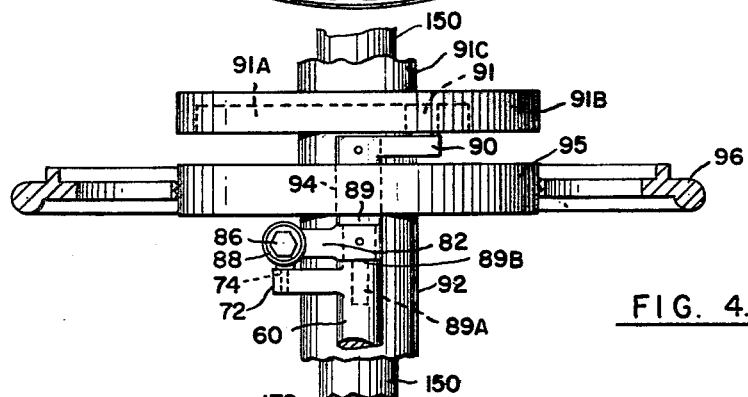
FIGURE 4 is an elevational view, partially broken away, showing details of gripping means on the turret.

Each rod 60 has extending from the upper portion thereof a lever 72 (FIGURE 4) which is connected by a pin 74 to an end 76 of a rod 78. Rod 78 passes through the hollow end 80 of an arm 82 which contains a compression spring 84 through which the rod passes. Rod 78 is provided with a headed end 86 which engages a washer 88 interposed between the said headed end and compression spring 84.

Arm 82 is fixedly connected to a reduced portion 89A of a rod 89 and fits into a recess 89B in rod 60. An arm 90 is secured to rod 89. A roller 91 attached to arm 90 follows a cam track 91A cut into disc 91B which is fixedly, by an integral collar 91C, secured to a fixed rod 150 which is secured to bracket 152 mounted on table 33. Each rod 89 passes through an opening 94 in disc 95 secured to the upper end of rotatable hollow shaft 92 which rotates about rod 150. A ring 96 is secured to disc 95 and in turn has secured thereto vertical support members 97, each having a reduced portion 98 passing through a disc 99, the disc 99 being secured to each member 97 by a nut 98A threaded to the reduced portion 98. Disc 99 is secured to a journal member 100 for rotation about rod 150.

Figure 8:
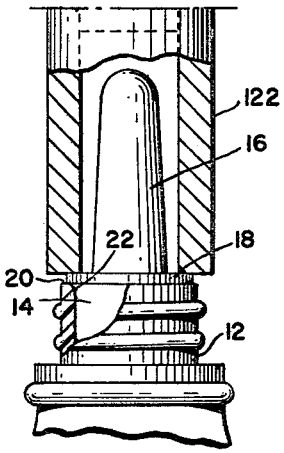
FIGURE 8 is an elevational view, partially broken away, illustrating the engagement of the plug of the container of FIGURE 7 by a sonic welder.

Each sonic converter 120 is provided with a horn 122 for engaging flange 18 in the manner shown in FIGURE 8. Sonic converters as used for welding together plastic parts are well-known to the art as are the associated horns, it is not deemed necessary to give any further detail. However, by way of typical example, the sonic converter may employ a lead zirconate titanate transducer element to convert an alternating voltage into mechanical vibrations.

Figure 5:
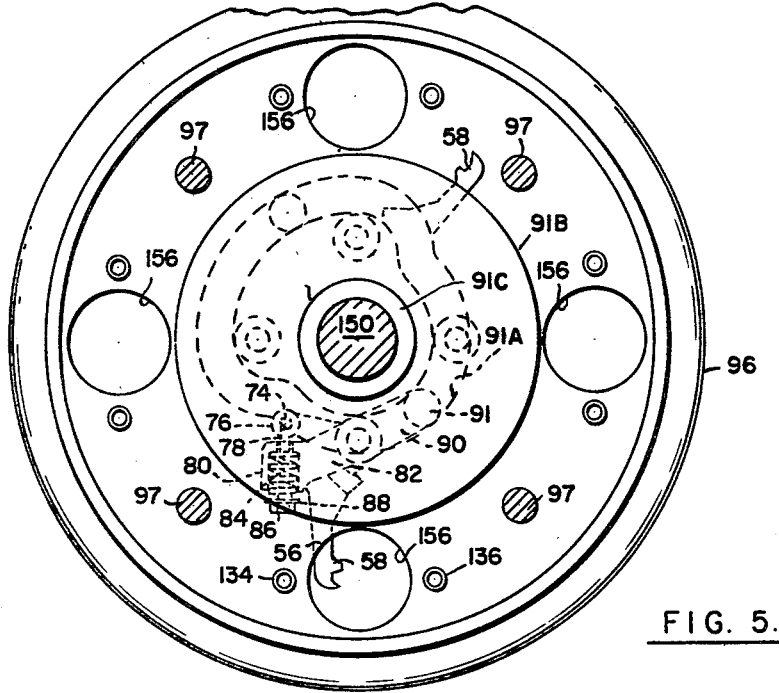
FIGURE 5 is a plan view of the structure shown in FIGURE 4.

Each converter 120 is retained by a retaining ring 124 which in turn is fixedly secured to a pair of opposed rods 126 and 128 and by a retaining ring 130 which also is secured to rods 126 and 128. Retaining ring 130 has interposed between it and the converter a cushion mounting ring 132. Rods 126 and 128 pass through bushings 134 and 136, respectively, mounted in ring 96 and bushings 138 and 140, respectively, mounted in disc 99. The upper end of rods 126 and 128 are secured together by a tie bar 144 (FIGURE 1) which carries a cam follower roller 146. Each cam follower roller 146 engages a cam 148 which is fixedly secured to a collar 149 secured to fixed rod 150 (FIGURE 1); openings 154 in disc 99 (FIGURE 2 and openings 156 in ring 96 (FIGURE 5) are provided for the movement of convertors 120.

Power supplied by a power cable 160, which is connected to a commutator indicated at 162 having a pair of brushes 164 and 166 each supported by a bracket 167 secured to a portion 98 of a member 97 and provided for each converter 120 with the pairs of brushes being connected by two wire cables 168, 170, 172 and 174, respectively, to the four converters 120 respectively. Commutator 162 is fixedly mounted on collar 149.

Figure 6:
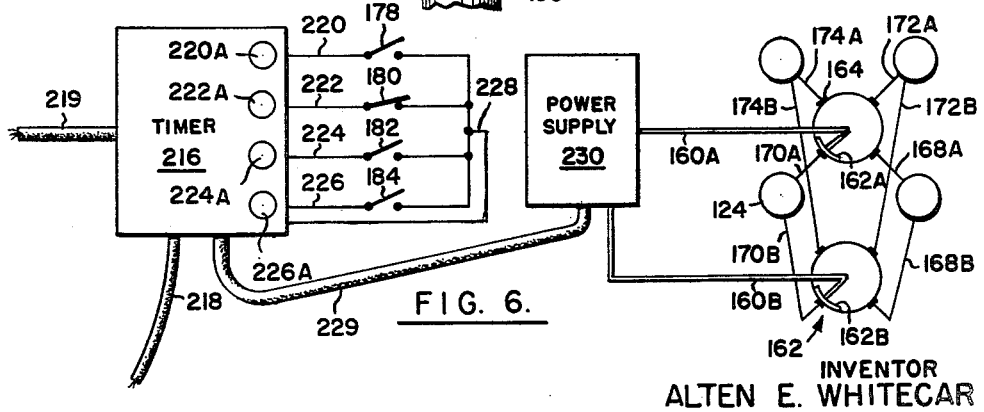
FIGURE 6 is a wiring diagram.

As shown in the wiring diagram FIGURE 6, power cable 160 has a line 160A which is connected to a segmental conductor 162A of commutator 162. Cable 160 also has a line 160B which is connected to a segmental conductor 162B of commutator 162. In the position of the part shown in the figures, power in being supplied to a converter 120 through line 170A of cable 170 with the said converter being connected by line 170B through segment 162B to power return line 160B. Similarly, lines 174A, 172A and 168A of cables 174, 172 and 168, respectively, are provided to supply power to the other three converters 120 while they are respectively connected to return line 160B through the commutator 162 and lines 174B, 172B and 168B respectively.

Figure 1:
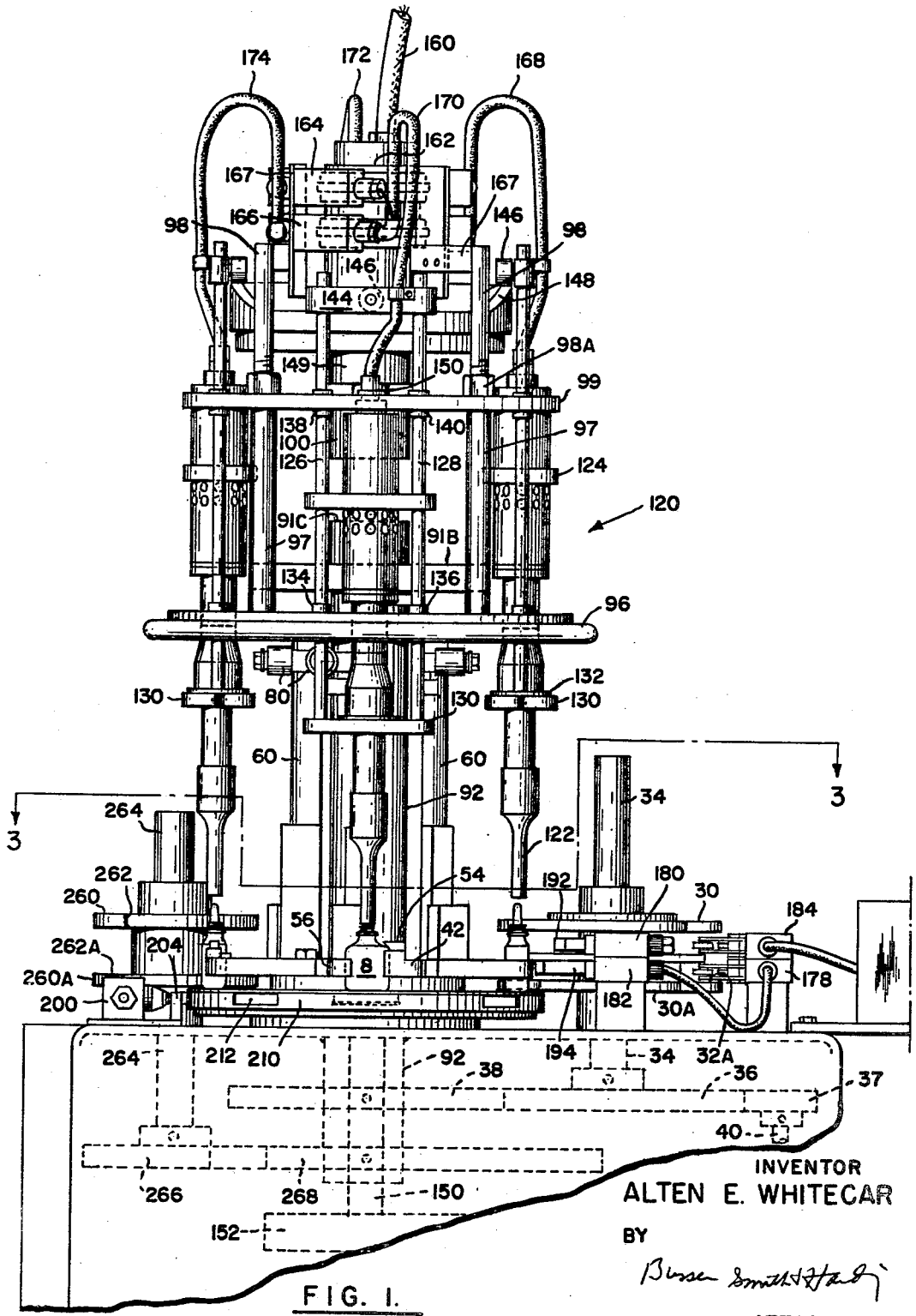
FIGURE 1 is a front elevation, partially broken away, of a preferred embodiment of the invention.

Switches 178, 180, 182 and 184, all of which are shown in FIGURES 1 and 6, are each provided with an outwardly biased switch operating rod 186 (FIGURE 3) which is engaged by a lever 188 having a cam follower roller 190. Switches 180 and 184 are actuated by upper cam 192 while switches 182 and 178 are actuated by lower cam 194 with both of said cams being secured to shaft 34 for rotation therewith. Switches 180, 184, 182 and 178 are used to sequentially introduce potentiometers described below into the timing circuit of timer 216.

Also involved in the actuation of the converters is switch 200 (FIGURE 3) having a control rod 202 which is engaged by a pivoted lever 204 which is spring biased toward turret base 46 by a compression coil spring indicated at 206. Lever 204 has a cam follower nose 208 which bears against the outer periphery 210 of turret base 46 which is provided with four equally spaced openings 212 (FIGURE 1) into which nose 208 can enter and be cammed out of in order to close and then open switch 200. Switch 200 is a so-called trigger switch and is connected to a timer 216 by cable 218 the momentary closing and then opening of switch 200 acting in a conventional manner to trigger or start the operation of timer 216.

Electronic timer 216 (FIGURE 6) is connected to a power supply line 219 and contains variable potentiometers 220A, 222A, 224A and 226A which are selectively introduced by switches 178, 180, 182 and 184 through lines 220, 222, 224 and 226 which are connected to line 228 which is in the timing circuit of timer 216. Line 229 connects the output of timer mechanism 216 to a power supply 230 which will change 60 cycle current supplied by power line 219 into, for example, 20,000 cycle current for distribution to the converters, the power supply 230 being connected to lines 160A and 160B. Time selectors 220a, 222a, 224a, and 226a are provided to adjust the time interval power is supplied to line 220, 222, 224 and 226, respectively.

Figure 9:
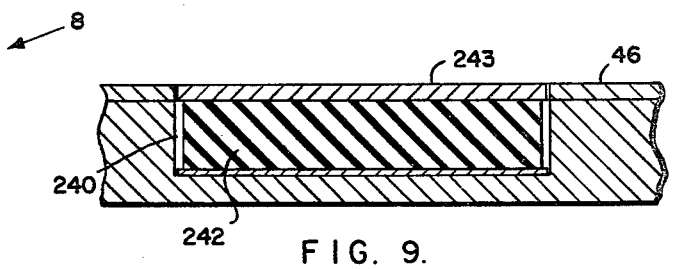
FIGURE 9 is a vertical section, partially broken away, taken on the plane indicated by the line 9—9 in FIGURE 3.

As shown in FIGURE 9, the upper surface of rotating base 46 of turret 48 is provided with recesses 240 associated with each gripper unit 44 and containing a resilient material 242 such as rubber to which is secured a metal sheet 243 which firms a resilient support for the container being welded. Conveying wheels 260 and 260A having fingers 262 and 262A respectively are mounted on shaft 264 driven by a gear 266 which in turn is driven by gear 268 secured to hollow shaft 92. Wheels 260 and 260A are driven at twice the angular rate of turret base 46. Guide rails 272 and 274 assist in returning containers 8 to conveyor 2.

OPERATION

In operation, containers 8 which are being conveyed by conveyor 2 and timed by timer wheel 41 are engaged by a finger 32 of wheel 30 and conveyed between rail portions 4a and 6a onto turret base 46 and inside of a guide rail indicated at 244 which is pivotally mounted as indicated at 246 and biased for rotation toward the center of the turret by an extension spring indicated at 248 with an adjustable stop 250 being provided to limit rotation under the urging of the spring. The rotating turret brings a gripper arm 42 in behind the container 8 as it is being advanced by wheel 30 and simultaneously gripper arm 56 actuated by rod 60 and the interaction of roller 91 and cam track 91a engages the leading end of bottle 8 with spring 84 acting to cushion the force exerted on container 8 by gripping arm 56 in the event a bottle enters accidentally in a crooked position. After the bottle is securely held by a gripper unit 44 and advanced beyond guide rail 244 which has urged container 8 into the gripper unit 44, cam track 148 permits the roller 146 associated with the converter 120 being carried by the turret over the container 8 to lower by gravity thus causing the associated rods 126 and 128 and the converter 120 to be lowered to place horn 122 in contact with flange 18 as viewed in FIGURE 8. Assuming as in the case illustrated in FIGURE 1 that the converter 120 which is connected to cable 170 is the converter we are talking about, the next step is for cam 192 to close switch 180 introducing potentiometer 222A into the timing circuit of timer 216 through lines 222 and 228. Immediately thereafter switch 200 is closed and then opened to trigger timer 216 into operation causing initiation of the timing operation which for a selected time delivers 60 cycle current through line 229 to power supply 230, which then supplies 20,000 cycle current to line 160A. At this point commutator 162 has been rotated to place its conducting portions 162A and 162B in contact with lines 170A and 170B respectively through the associated brushes 164 and 166 and energize the associated converter 120. The thus created mechanical vibrations are carried to flange 18 through horn 122 to cause the necessary heating between flange 18 and the top of neck 12 and the welding of these parts together. The welding operation is terminated at a predetermined time by timer 216. Subsequent to the welding operation, cam follower roller 146 is urged upwardly by cam 148 causing horn 122 to be withdrawn above container 8. Container 8 is carried by gripper unit 44 to a position where it engages guide rail 272 and is engaged by fingers 262 and 262A of conveying wheels 260 and 260A at which juncture gripper arm 52 is rotated to release container 8 by virtue of the rotation of the associated rod 60 caused by cam follower roller 91 and cam track 91A. Fingers 262 and 262A carry container onto conveyor 2 between guide rail 272 and 274 where the container is released to be conveyed by conveyor 2.

It is believed that the above description makes entirely obvious the operation of the sonic welding apparatus described above it being understood that each of switches 184, 182 and 178 is actuated variously by the associated cams 192 and 194 to introduce potentiometers 226A, 224A and 220A sequentially to provide for individual timing of the converters 120 and, the appropriate set of brushes 164 and 166 effect energizing of the desired converter 120.

It will be understood that the foregoing description is illustrative and is not intended to be limiting.

I claim:
1. Sonic welding apparatus comprising:
a rotatable turret,
means to rotate the turret,
a plurality of means on the turret to hold an assembly of plastic parts for rotation with the turret,
conveying means to deliver an assembly of plastic parts to each holding means,
conveying means to receive an assembly of plastic parts from each said holding means and conveying it away from the turret,
a plurality of sonic welders mounted on the turret with each sonic welder being associated with a holding means,
means to move each sonic welder into contact with and away from a said assembly held by the associated holding means as the holding means is rotated between the delivering and receiving conveying means,
means to energize each sonic welder during a predetermined period of the time it is in contact with an assembly of parts.

2. The apparatus of claim 1 in which the turret rotates continuously.

3. The apparatus of claim 2 in which each holding means comprises a pair of arms and cam means to move at least one of said arms to grip and release a container.

4. The apparatus of claim 2 in which the means to move each sonic welder includes a cam and a cam follower connected to the sonic welder.

5. The apparatus of claim 2 in which each holding means comprises a pair of arms and cam means to move at least one of said arms to grip and release a container and the means to move each sonic welder includes a cam and a cam follower connected to the sonic welder.

6. The apparatus of claim 2 in which the energizing means includes cam activated switches and a commutator.

7. A sonic welding apparatus comprising:
a rotatable turret having a hollow shaft,
a fixed rod passing upwardly through and above said hollow shaft,
means to rotate the turret continuously,
a plurality of means on the turret to hold an assembly of plastic parts for rotation with the turret,
conveying means to deliver an assembly of plastic parts to each holding means,
conveying means to receive an assembly of plastic parts for each holding means and convey it from the turret,
a plurality of sonic welders mounted on the hollow shaft with each sonic welder associated with a holding means,
means connected to said rod and said sonic welders to move each sonic welder into contact with and away from a said assembly held by the associated holding means as the holding means is rotated between the delivering and receiving conveying means,
means to energize each sonic welder during a predetermined period of the time it is in contact with an assembly of parts.

8. The apparatus of claim 7 in which the turret rotates continuously.

9. The apparatus of claim 7 in which each holding means comprises a pair of arms and cam means to move at least one of said arms to grip and release a container.

10. The apparatus of claim 7 in which the means to move each sonic welder includes a cam and a cam follower connected to the sonic welder.

11. The apparatus of claim 7 in which each holding means comprises a pair of arms and cam means to move at least one of said arms to grip and release a container and the means to move each sonic welder includes a cam and a cam follower connected to the sonic welder.

12. The apparatus of claim 7 in which the energizing means includes cam activated switches and a commutator.

13. The apparatus of claim 7 in which the means to energize each sonic welder during a predetermined period of the time it is in contact with an assembly of parts are independently adjustable as to time.

References Cited

UNITED STATES PATENTS 2,760,551    8/1956    Downey et al. _____ 156—69 X

SAMUEL FEINBERG, Primary Examiner

S. C. BENTLEY, Assistant Examiner

U.S. Cl. X.R.
156—580